(12) United States Patent  
Glidden, III

(10) Patent No.: US 9,165,232 B2  
(45) Date of Patent: Oct. 20, 2015

(54) RADIO-FREQUENCY IDENTIFICATION (RFID) TAG-TO-TAG AUTOCONNECT DISCOVERY, AND RELATED METHODS, CIRCUITS, AND SYSTEMS

(75) Inventor: Robert Mason Glidden, III, Rancho Palos Verdes, CA (US)

(73) Assignee: Corning Incorporated, Corning, NY (US)

( * ) Notice: Subject to any disclaimer, the term of this patent is extended or adjusted under 35 U.S.C. 154(b) by 761 days.

(21) Appl. No.: 13/470,571

(22) Filed: May 14, 2012

(65) Prior Publication Data

US 2013/0300539 A1    Nov. 14, 2013

(51) Int. Cl.
| | |
|---|---|
| G02B 6/36 | (2006.01) |
| G06K 19/07 | (2006.01) |
| G02B 6/38 | (2006.01) |
| H01R 13/46 | (2006.01) |
| G06K 19/077 | (2006.01) |
| H04Q 1/02 | (2006.01) |

(52) U.S. Cl.
CPC .......... G06K 19/0717 (2013.01); G02B 6/3895 (2013.01); G06K 19/07758 (2013.01); H01R 13/465 (2013.01); H04Q 1/138 (2013.01)

(58) Field of Classification Search
CPC ............................ G02B 6/3895; H01R 13/465
See application file for complete search history.

(56) References Cited

U.S. PATENT DOCUMENTS

| | | | |
|---|---|---|---|
| 4,072,930 A | 2/1978 | Lucero et al. | |
| 4,529,970 A | 7/1985 | Wynne | |
| 4,812,007 A | 3/1989 | Lukas | |
| 4,889,977 A | 12/1989 | Haydon et al. | |
| 4,925,205 A | 5/1990 | Villalon et al. | |
| 5,018,759 A | 5/1991 | Villalon et al. | |
| 5,263,032 A | 11/1993 | Porter et al. | |
| 5,483,467 A | 1/1996 | Krupka et al. | |
| 5,499,012 A | 3/1996 | Tracy et al. | |
| 5,528,222 A | 6/1996 | Moskowitz et al. | |
| 5,638,474 A | 6/1997 | Lampert et al. | |
| 5,737,464 A | 4/1998 | Underwood et al. | |
| 5,772,461 A | 6/1998 | Yu | |
| 5,821,510 A | 10/1998 | Cohen et al. | |

(Continued)

FOREIGN PATENT DOCUMENTS

| | | |
|---|---|---|
| CN | 1395975 A | 2/2003 |
| CN | 1496019 A | 5/2004 |

(Continued)

OTHER PUBLICATIONS

Non-final Office Action for U.S. Appl. No. 12/956,271 mailed May 15, 2014, 29 pages.

(Continued)

Primary Examiner — Andrew Bee

(57) ABSTRACT

Methods, circuits, and systems are disclosed for automatically detecting connections between RFID tags. In one embodiment, a method is provided that includes periodically placing a charge on a node shared between a first RFID tag and a second RFID tag. The method also comprises sensing a voltage at the node at a time subsequent to the placing of the charge. The method also comprises automatically determining whether a connection exists between the first RFID tag and the second RFID tag based on the sensing of the voltage at the node. The first RFID tag and/or the second RFID tag may include circuitry configured to perform the method.

35 Claims, 10 Drawing Sheets

(56) References Cited

U.S. PATENT DOCUMENTS

| | | |
|---|---|---|
| 5,848,910 A | 12/1998 | Crocker |
| 5,892,870 A | 4/1999 | Fingler et al. |
| 5,910,776 A | 6/1999 | Black |
| 5,914,862 A | 6/1999 | Ferguson et al. |
| 5,995,006 A | 11/1999 | Walsh |
| 6,002,331 A | 12/1999 | Laor |
| 6,025,725 A | 2/2000 | Gershenfeld et al. |
| 6,025,783 A | 2/2000 | Steffens, Jr. |
| 6,100,804 A | 8/2000 | Brady et al. |
| 6,118,379 A | 9/2000 | Kodukula et al. |
| 6,127,929 A | 10/2000 | Roz |
| 6,133,835 A | 10/2000 | De Leeuw et al. |
| 6,164,551 A | 12/2000 | Altwasser |
| 6,232,870 B1 | 5/2001 | Garber et al. |
| 6,320,509 B1 | 11/2001 | Brady et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,496,113 B2 | 12/2002 | Lee et al. |
| 6,496,382 B1 | 12/2002 | Ferguson et al. |
| 6,517,000 B1 | 2/2003 | McAllister et al. |
| 6,522,308 B1 | 2/2003 | Mathieu |
| 6,552,664 B2 | 4/2003 | Nishikawa et al. |
| 6,592,266 B1 | 7/2003 | Hankins et al. |
| 6,609,833 B1 | 8/2003 | Miyachi et al. |
| 6,618,022 B2 | 9/2003 | Harvey |
| 6,693,513 B2 | 2/2004 | Tuttle |
| 6,752,538 B1 | 6/2004 | Bates, III |
| 6,784,802 B1 | 8/2004 | Stanescu |
| 6,806,808 B1 | 10/2004 | Watters et al. |
| 6,808,116 B1 | 10/2004 | Eslambolchi et al. |
| 6,821,024 B2 | 11/2004 | Bates, III |
| 6,829,427 B1 | 12/2004 | Becker |
| 6,847,856 B1 | 1/2005 | Bohannon |
| 6,857,897 B2 | 2/2005 | Conn |
| 6,897,374 B2 | 5/2005 | Garber et al. |
| 6,898,368 B2 | 5/2005 | Colombo et al. |
| 6,899,626 B1 | 5/2005 | Luciano et al. |
| 6,915,050 B2 | 7/2005 | Koyasu et al. |
| 6,924,997 B2 | 8/2005 | Chen et al. |
| 6,968,994 B1 | 11/2005 | Smith |
| 6,971,895 B2 | 12/2005 | Sago et al. |
| 6,973,243 B2 | 12/2005 | Koyasu et al. |
| 6,992,599 B2 | 1/2006 | Vergnaud et al. |
| 6,999,028 B2 | 2/2006 | Egbert |
| 7,014,100 B2 | 3/2006 | Zierolf |
| 7,034,683 B2 | 4/2006 | Ghazarian |
| 7,061,366 B2 | 6/2006 | Bell et al. |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,102,520 B2 | 9/2006 | Liu et al. |
| 7,151,455 B2 | 12/2006 | Lindsay et al. |
| 7,158,031 B2 | 1/2007 | Tuttle |
| 7,158,033 B2 | 1/2007 | Forster |
| 7,165,728 B2 | 1/2007 | Durrant et al. |
| 7,168,972 B1 | 1/2007 | Autry et al. |
| 7,170,393 B2 | 1/2007 | Martin |
| 7,193,422 B2 | 3/2007 | Velleca et al. |
| 7,194,180 B2 | 3/2007 | Becker |
| 7,205,898 B2 | 4/2007 | Dixon et al. |
| 7,209,042 B2 | 4/2007 | Martin et al. |
| 7,210,858 B2 | 5/2007 | Sago et al. |
| 7,221,277 B2 | 5/2007 | Caron et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,243,837 B2 | 7/2007 | Durrant et al. |
| 7,249,705 B2 | 7/2007 | Dudley |
| 7,253,735 B2 | 8/2007 | Gengel et al. |
| 7,265,674 B2 | 9/2007 | Tuttle |
| 7,275,970 B2 | 10/2007 | Hoshina |
| 7,294,786 B2 | 11/2007 | Aldereguia et al. |
| 7,297,028 B2 | 11/2007 | Daikuhara et al. |
| 7,298,266 B2 | 11/2007 | Forster |
| 7,298,330 B2 | 11/2007 | Forster et al. |
| 7,306,489 B2 | 12/2007 | Werthman et al. |
| 7,307,408 B2 | 12/2007 | Porcu et al. |
| 7,336,883 B2 | 2/2008 | Scholtz |
| 7,348,884 B2 | 3/2008 | Higham |
| 7,349,605 B2 | 3/2008 | Noonan et al. |
| 7,352,285 B2 | 4/2008 | Sakama et al. |
| 7,352,289 B1 | 4/2008 | Harris |
| 7,356,208 B2 | 4/2008 | Becker |
| 7,374,101 B2 | 5/2008 | Kaneko |
| 7,468,669 B1 | 12/2008 | Beck et al. |
| 7,495,558 B2 | 2/2009 | Pope et al. |
| 7,515,048 B1 | 4/2009 | Bhattiprolu et al. |
| 7,551,854 B2 | 6/2009 | Horiuchi et al. |
| 7,554,448 B2 | 6/2009 | Tomioka |
| 7,605,707 B2 | 10/2009 | German et al. |
| 7,642,916 B2 | 1/2010 | Phipps et al. |
| 7,657,338 B2 | 2/2010 | Opaterny |
| 7,695,310 B2 | 4/2010 | Boyer et al. |
| 7,731,094 B2 | 6/2010 | Phillips |
| 7,757,936 B2 | 7/2010 | Aguren et al. |
| 7,772,975 B2 | 8/2010 | Downie et al. |
| 7,782,202 B2 | 8/2010 | Downie et al. |
| 7,786,861 B2 | 8/2010 | Howarth et al. |
| 7,812,737 B1 | 10/2010 | Hunter |
| 7,854,623 B2 | 12/2010 | Radenne et al. |
| 7,898,397 B2 | 3/2011 | Kerr et al. |
| 7,909,619 B2 | 3/2011 | Pepe et al. |
| 7,961,097 B2 | 6/2011 | Porte et al. |
| 7,965,186 B2 | 6/2011 | Downie et al. |
| 7,973,662 B2 | 7/2011 | Phipps et al. |
| 8,044,804 B1 | 10/2011 | McReynolds |
| 8,106,752 B2 | 1/2012 | Golden |
| RE43,178 E | 2/2012 | Ghazarian |
| 8,162,738 B2 | 4/2012 | Erickson |
| 8,172,468 B2 | 5/2012 | Jones et al. |
| 8,233,804 B2 | 7/2012 | Aguren |
| 8,260,132 B2 | 9/2012 | Aguren |
| 8,324,519 B2 | 12/2012 | Slicker et al. |
| 8,333,518 B2 | 12/2012 | Jones et al. |
| 8,334,752 B2 | 12/2012 | Kukita et al. |
| 8,334,761 B2 | 12/2012 | Golden |
| 2001/0004236 A1 | 6/2001 | Letkomiller et al. |
| 2002/0089434 A1 | 7/2002 | Ghazarian |
| 2002/0092347 A1 | 7/2002 | Niekerk et al. |
| 2002/0140546 A1 | 10/2002 | Tuttle |
| 2003/0016130 A1 | 1/2003 | Joao |
| 2003/0016136 A1 | 1/2003 | Harvey |
| 2003/0021580 A1 | 1/2003 | Matthews |
| 2003/0061393 A1 | 3/2003 | Steegmans et al. |
| 2003/0179073 A1 | 9/2003 | Ghazarian |
| 2004/0041714 A1 | 3/2004 | Forster |
| 2004/0052471 A1 | 3/2004 | Colombo et al. |
| 2004/0114879 A1 | 6/2004 | Hiereth et al. |
| 2004/0117515 A1 | 6/2004 | Sago et al. |
| 2004/0145454 A1 | 7/2004 | Powell et al. |
| 2004/0149736 A1 | 8/2004 | Clothier |
| 2004/0202431 A1 | 10/2004 | Bates, III |
| 2004/0253874 A1 | 12/2004 | Plishner |
| 2004/0257199 A1 | 12/2004 | Fitzgibbon et al. |
| 2005/0024287 A1 | 2/2005 | Jo et al. |
| 2005/0052287 A1 | 3/2005 | Whitesmith et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0150962 A1 | 7/2005 | Colombo et al. |
| 2005/0215119 A1 | 9/2005 | Kaneko |
| 2005/0224585 A1 | 10/2005 | Durrant et al. |
| 2005/0232636 A1 | 10/2005 | Durrant et al. |
| 2005/0242950 A1 | 11/2005 | Lindsay et al. |
| 2005/0259930 A1 | 11/2005 | Elkins et al. |
| 2005/0280512 A1 | 12/2005 | Forster |
| 2005/0285718 A1 | 12/2005 | Enguent |
| 2005/0286893 A1 | 12/2005 | Horiuchi et al. |
| 2006/0006242 A1 | 1/2006 | Hashimoto |
| 2006/0006999 A1 | 1/2006 | Walczyk et al. |
| 2006/0015233 A1 | 1/2006 | Olsen |

(56) References Cited

U.S. PATENT DOCUMENTS

| | | |
|---|---|---|
| 2006/0019540 A1 | 1/2006 | Werthman et al. |
| 2006/0044148 A1 | 3/2006 | Daniels et al. |
| 2006/0049942 A1 | 3/2006 | Sakama et al. |
| 2006/0139149 A1 | 6/2006 | Faro et al. |
| 2006/0145863 A1 | 7/2006 | Martin et al. |
| 2006/0148279 A1 | 7/2006 | German et al. |
| 2006/0166546 A1 | 7/2006 | Ashizawa |
| 2006/0187031 A1 | 8/2006 | Moretti et al. |
| 2006/0214775 A1 | 9/2006 | Watanabe et al. |
| 2006/0232419 A1 | 10/2006 | Tomioka et al. |
| 2006/0233506 A1 | 10/2006 | Noonan et al. |
| 2006/0267737 A1 | 11/2006 | Colby |
| 2006/0267778 A1 | 11/2006 | Gengel et al. |
| 2007/0001807 A1 | 1/2007 | Malone et al. |
| 2007/0018787 A1 | 1/2007 | Martinez de Velasco Cortina et al. |
| 2007/0023525 A1 | 2/2007 | Son et al. |
| 2007/0053644 A1 | 3/2007 | Scholtz |
| 2007/0057771 A1 | 3/2007 | Tomioka |
| 2007/0120684 A1 | 5/2007 | Utaka et al. |
| 2007/0152828 A1 | 7/2007 | Mohalik |
| 2007/0176745 A1 | 8/2007 | Gibson et al. |
| 2007/0205897 A1 | 9/2007 | Forster |
| 2007/0205902 A1 | 9/2007 | Cote et al. |
| 2007/0216534 A1 | 9/2007 | Ferguson et al. |
| 2007/0236355 A1 | 10/2007 | Flaster et al. |
| 2007/0247284 A1 | 10/2007 | Martin et al. |
| 2007/0270744 A1 | 11/2007 | Dacquay et al. |
| 2007/0273507 A1 | 11/2007 | Burchell et al. |
| 2008/0030353 A1 | 2/2008 | O'Toole et al. |
| 2008/0048826 A1 | 2/2008 | Agrawal et al. |
| 2008/0048857 A1 | 2/2008 | Billmaier et al. |
| 2008/0082298 A1 | 4/2008 | Sjolander |
| 2008/0100440 A1 | 5/2008 | Downie et al. |
| 2008/0100456 A1 | 5/2008 | Downie et al. |
| 2008/0100467 A1 | 5/2008 | Downie et al. |
| 2008/0122579 A1 | 5/2008 | German et al. |
| 2008/0122641 A1 | 5/2008 | Amidi |
| 2008/0136634 A1 | 6/2008 | Porte et al. |
| 2008/0159738 A1 | 7/2008 | Lavranchuk |
| 2008/0220721 A1 | 9/2008 | Downie et al. |
| 2008/0240724 A1 | 10/2008 | Aguren |
| 2008/0279555 A1 | 11/2008 | Horiuchi et al. |
| 2008/0298019 A1 | 12/2008 | Spearing et al. |
| 2009/0032577 A1 | 2/2009 | Aguren et al. |
| 2009/0108989 A1 | 4/2009 | Sinclair |
| 2009/0184165 A1 | 7/2009 | Bertness et al. |
| 2009/0206995 A1 | 8/2009 | Forster |
| 2009/0213830 A1 | 8/2009 | Duesberg et al. |
| 2010/0079248 A1 | 4/2010 | Greveling |
| 2010/0080554 A1 | 4/2010 | Aguren |
| 2010/0123580 A1 | 5/2010 | Marmigere et al. |
| 2010/0148933 A1 | 6/2010 | Dacus |
| 2010/0210011 A1 | 8/2010 | Hilpert et al. |
| 2010/0245057 A1 | 9/2010 | Chamarti et al. |
| 2011/0043333 A1 | 2/2011 | German |
| 2011/0130720 A1 | 6/2011 | Strobl et al. |
| 2011/0140856 A1 | 6/2011 | Downie et al. |
| 2011/0205058 A1 | 8/2011 | Phipps et al. |
| 2011/0274437 A1 | 11/2011 | Jones et al. |
| 2012/0007717 A1 | 1/2012 | Jong |
| 2012/0019363 A1 | 1/2012 | Fein |
| 2012/0067709 A1 | 3/2012 | Slicker et al. |
| 2012/0086569 A1 | 4/2012 | Golden |
| 2012/0126949 A1 | 5/2012 | Downie et al. |
| 2012/0126950 A1 | 5/2012 | Downie et al. |
| 2012/0133490 A1 | 5/2012 | Downie et al. |
| 2012/0168521 A1 | 7/2012 | Jones et al. |
| 2012/0256756 A1 | 10/2012 | Johnson et al. |
| 2012/0257890 A1 | 10/2012 | Aguren |
| 2012/0274452 A1 | 11/2012 | Chamarti et al. |

FOREIGN PATENT DOCUMENTS

| | | |
|---|---|---|
| CN | 1293508 C | 1/2007 |
| CN | 101636767 A | 1/2010 |
| CN | 101636890 A | 1/2010 |
| DE | 19841738 A1 | 3/2000 |
| DE | 10249414 A1 | 5/2004 |
| EP | 1455550 A2 | 9/2004 |
| EP | 1959579 A1 | 8/2008 |
| GB | 2371211 A | 7/2002 |
| JP | 03242795 A | 10/1991 |
| JP | 2003148653 A | 10/1991 |
| JP | 2002264617 A | 9/2002 |
| JP | 2003172827 A | 6/2003 |
| JP | 2003229215 A | 8/2003 |
| JP | 2004039389 A | 2/2004 |
| JP | 2004142500 A | 5/2004 |
| JP | 2004152543 A | 5/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005033857 A | 2/2005 |
| JP | 2005050581 A | 2/2005 |
| JP | 2005084162 A | 3/2005 |
| JP | 2005086901 A | 3/2005 |
| JP | 2005087135 A | 4/2005 |
| JP | 2005092107 A | 4/2005 |
| JP | 2005134125 A | 5/2005 |
| JP | 2005216698 A | 8/2005 |
| JP | 2005302403 A | 10/2005 |
| JP | 2005315980 A | 11/2005 |
| JP | 2005339983 A | 12/2005 |
| JP | 2006054118 A | 2/2006 |
| JP | 2006245983 A | 9/2006 |
| JP | 2006279650 A | 10/2006 |
| JP | 2007087849 A | 4/2007 |
| JP | 2007088957 A | 4/2007 |
| JP | 2007158993 A | 6/2007 |
| JP | 2007189774 A | 7/2007 |
| JP | 2007221400 A | 8/2007 |
| JP | 2008135882 A | 6/2008 |
| WO | 0155991 A1 | 8/2001 |
| WO | 03098175 A1 | 11/2003 |
| WO | 2004030154 A2 | 4/2004 |
| WO | 2005069203 A2 | 7/2005 |
| WO | 2006058119 A1 | 6/2006 |
| WO | 2008000656 A1 | 1/2008 |
| WO | 2008038896 A1 | 4/2008 |
| WO | 2009091888 A1 | 7/2009 |

OTHER PUBLICATIONS

Final Office Action for U.S. Appl. No. 13/826,261 mailed May 16, 2014, 17 pages.
First Office Action for Chinese patent application 201180022558.4 mailed Apr. 30, 2014, 10 pages.
International Search Report and Written Opinion for PCT/US2013/053335 mailed May 21, 2014, 11 pages.
Non-final Office Action for U.S. Appl. No. 12/956,271 mailed Mar. 1, 2013, 25 pages.
Non-final Office Action for U.S. Appl. No. 13/094,026 mailed Mar. 26, 2013, 24 pages.
Non-final Office Action for U.S. Appl. No. 13/418,752 mailed Jul. 2, 2012, 8 pages.
Written Opinion of the International Searching Authority for European Patent application 10788172.4—2210 mailed Jul. 6, 2012, 14 pages.
Written Opinion of the International Searching Authority for European patent application 11720243.2 mailed Dec. 18, 2012, 8 pages.
International Search Report for PCT/US2010/057605 mailed Feb. 17, 2011, 2 pages.
Decision on Rejection for Chinese patent application 200780046357.1 mailed Nov. 5, 2012, 7 pages.

(56) References Cited

OTHER PUBLICATIONS

Author Unknown, "How can an RFID reader interrogate multiple tags simultaneously?", RFID Journal, Sep. 8, 2010, 2 pages, www.rfidjournal.com/expert/entry/7853.
Third Office Action for Chinese patent application 200880104077.6 mailed Feb. 17, 2013, 17 pages.
International Search Report and Written Opinion for PCT/US2012/030779 mailed Jun. 21, 2012, 9 pages.
International Search Report and Written Opinion for PCT/US07122896 mailed May 9, 2008, 11 pages.
International Search Report and Written Opinion for PCT/US2011/034729 mailed Jul. 12, 2011, 16 pages.
International Search Report and Written Opinion for PCT/US2010/027766, mailed May 9, 2011, 12 pages.
International Search Report and Written Opinion for PCT/US2010/057605 mailed Feb. 17, 2011, 11 pages.
Non-final Office Action for U.S. Appl. No. 13/094,026 mailed Aug. 2, 2013, 25 pages.
Advisory Action for U.S. Appl. No. 12/956,271 mailed Nov. 1, 2013, 3 pages.
Final Office Action for U.S. Appl. No. 13/094,026 mailed Nov. 20, 2013, 33 pages.
Non-final Office Action for U.S. Appl. No. 13/826,261 mailed Oct. 23, 2013, 17 pages.
Non-final Office Action for U.S. Appl. No. 12/956,271 mailed Nov. 5, 2014, 11 pages.
Non-final Office Action for U.S. Appl. No. 13/826,261 mailed Jan. 7, 2015, 14 pages.
Translation of Search Report for Taiwan patent application 099108786 mailed Dec. 27, 2014, 1 page.
Advisory Action for U.S. Appl. No. 13/094,026 mailed Feb. 11, 2014, 5 pages.
Communication under Rule 71 (3) EPC for European patent application 11720243.2 mailed Feb. 12, 2014, 7 pages.
International Search Report for PCT/US2013/039894 mailed Sep. 3, 2013, 3 pages.
Final Office Action for U.S. Appl. No. 12/956,271 mailed Aug. 15, 2013, 28 pages.
First Office Action for Chinese patent application 201080015805.3 mailed Jul. 23, 2013, 17 pages.
Advisory Action and Applicant-Initiated Interview Summary for U.S. Appl. No. 13/826,261 mailed Jul. 31, 2014, 5 pages.
Advisory Action for U.S. Appl. No. 13/826,261 mailed Aug. 29, 2014, 3 pages.
Notice on Reexamination for Chinese Patent Application 200780046357.1 mailed Jul. 24, 2014, 7 pages.
First Office Action for Chinese patent application 201080062636.9 mailed Jul. 31, 2014, 23 pages.
International Preliminary Report on Patentability for PCT/US2012/030779 mailed Nov. 7, 2013, 6 pages.
Notice on Reexamination for Chinese patent application 200780046357.1 mailed Mar. 10, 2015, 12 pages.
Second Office Action for Chinese patent application 201080062636.9 mailed Jan. 16, 2015, 7 pages.
International Preliminary Report on Patentability for PCT/US2013/053335 mailed Feb. 12, 2015, 7 pages.
Non-final Office Action for U.S. Appl. No. 13/566,228 mailed Jan. 28, 2015, 28 pages.
Extended European Search Report for European Patent Application 07870826.0 mailed Jun. 15, 2015, 8 pages.
Translation of the Third Office Action for Chinese Patent Application 201080062636.9 mailed Jul. 22, 2015, 9 pages.
Notice of Allowance for U.S. Appl. No. 12/956,271 mailed Jun. 9, 2015, 8 pages.
Final Office Action for U.S. Appl. No. 13/566,228 mailed Jul. 8, 2015, 30 pages.
Final Office Action for U.S. Appl. No. 13/826,261 mailed Jun. 24, 2015, 16 pages.

RADIO-FREQUENCY IDENTIFICATION (RFID) TAG-TO-TAG AUTOCONNECT DISCOVERY, AND RELATED METHODS, CIRCUITS, AND SYSTEMS

RELATED APPLICATIONS

This application is related to co-pending U.S. patent application Ser. No. 13/363,808 filed Feb. 1, 2012, entitled "RADIO-FREQUENCY IDENTIFICATION (RFID) CONNECTED TAG COMMUNICATION PROTOCOL AND RELATED SYSTEM AND METHODS," which is incorporated by reference in its entirety.

This application is also related to co-pending U.S. patent application Ser. No. 13/363,851 filed Feb. 1, 2012, entitled "PROTOCOL FOR COMMUNICATIONS BETWEEN A RADIO FREQUENCY IDENTIFICATION (RFID) TAG AND A CONNECTED DEVICE, AND RELATED SYSTEMS AND METHODS", which is incorporated by reference in its entirety.

This application is also related to co-pending U.S. patent application Ser. No. 13/363,890 filed Feb. 1, 2012, entitled "COMMUNICATIONS BETWEEN MULTIPLE RADIO FREQUENCY IDENTIFICATION (RFID) CONNECTED TAGS AND ONE OR MORE DEVICES, AND RELATED SYSTEMS AND METHODS," which is incorporated herein by reference in its entirety.

BACKGROUND

1. Field of the Disclosure

The technology of the disclosure relates to use of radio-frequency (RF) communications, including communications involving RF identification (RFID) tags or transponders.

2. Technical Background

It is well known to employ radio-frequency (RF) identification (RFID) transponders to identify articles of manufacture. RFID transponders are often referred to as "RFID tags." RFID tags are comprised of an antenna coupled to an integrated circuit (IC). An identification number or other characteristic is stored in the IC or memory coupled to the IC. The identification number can be provided to another system, such as an RFID reader, to provide identification information for a variety of purposes. For example, if an RFID tag is an active device, the RFID tag includes a transmitter that can transmit the identification. If the RFID tag is a passive or semi-passive device, the RFID tag does not include a transmitter. The passive or semi-passive RFID tag includes a receiver that receives a wireless RF signal from a transmitter over an antenna, also known as an interrogation signal. The passive or semi-passive RFID tag can respond to receipt of the interrogation signal, including providing identification information, via backscatter modulation communications, as an example.

One application of RFID tags is in communication systems to provide information regarding communication components, such as connectors and adapters as examples. In this regard, the communication components are RFID-equipped. An RFID reader can be provided as part of an RFID system to receive stored information about the RFID-equipped communication components. The RFID reader can interrogate RFID tags disposed in communication components in the range of the RFID reader to automatically discover communication components present in the RFID system. The RFID reader may provide the identification information regarding the communication components to a host computer system. The RFID tags disposed in two communication components can also exchange identification information when connected together to provide connection information to the RFID reader when interrogated. Thus, it is possible to determine when two particular communication components are connected or joined together and when the connection is separated. However, in order for the RFID reader to discover the communication components present in the RFID system and determine when two particular communication components are connected or separated, a significant number of unique queries must be performed by the RFID reader and each of these queries may involve many commands and responses between the RFID reader and the set of RFID tags.

Passive RFID tags have emerged for tracking all manner of objects as a high-performance alternative to bar codes. They are conceptually simple and inexpensive (as little as pennies per tag) and can be read in locations not having a direct line of sight to the tag, through other materials and at relatively long distances (typically, up to 10 meters). Passive RFID tags operate indefinitely without a dedicated power source, such as a battery, deriving their energy solely from radio waves emitted from a nearby reader. Therefore, passive RFID tags can be made as small, thin, and light as a paper label. Passive RFID tags communicate with adjacent RFID readers by selectively reflecting some of the transmitted energy back to the RFID reader, much the same way as a radar works.

RFID tags offer a unique capability in taking inventory of, and inferring the connectivity of, cable components in data centers. Optical cables are made of dielectric materials and have no means for electrically reading serial numbers and configuration data. All markings must appear in printed symbology, and records of interconnections must be kept by manual means. However, the complexity and reconfigurability of interconnects in patch panels call for automated solutions to configuration discovery and asset management, in the interest of accuracy and productivity.

One previously unsolved problem with RFID tags in the intended application is providing a means for RFID tags to exchange information between connected sets, thereby enabling connectivity to be inferred. With their limited power budget, this presents special challenges. In particular, it is difficult to detect when RFID tags are connected, especially when two RFID tags are connected and one of the two RFID tags is unpowered. In addition, it may be desirable that RFID tags sense connection and disconnection events in near-real-time, as the event itself is significant in the operation of a data center. Operations management needs to know when cabling has been reconfigured, with time stamps for keeping an audit trail and with alarms for erroneous events should they occur.

Thus, a need exists for a low-power, instantaneous way of sensing connection and disconnection events between electronic circuits, such as in RFID tags.

SUMMARY OF THE DETAILED DESCRIPTION

Embodiments disclosed herein include methods, circuits, and systems for RFID tag-to-tag autoconnect discovery. The embodiments include methods, circuits, and systems for sensing connection and disconnection events between electronic circuits, particularly those in RFID tags. In one embodiment, a disclosed method includes periodically placing a charge on a node shared between a first RFID tag and a second RFID tag. A voltage is then sensed at the node at a time subsequent to the placing of the charge. The method comprises automatically determining whether a connection exists between the first RFID tag and the second RFID tag based on the sensing of the voltage at the node subsequent to the placing of the charge. In this manner, RFID tags can automatically detect a connection to another RFID tag to exchange information between the RFID tags, as a non-limiting example. Exchanging information between RFID tags can be used for non-limiting applications such as knowing when cabling has been reconfigured, providing time stamps audit trailing, and providing alarms for erroneous events.

In a second embodiment, a circuit on a radio-frequency identification (RFID) tag for automatically detecting a connection between the RFID tag and another RFID tag is disclosed. The RFID tag comprises circuitry configured to periodically place a charge on a node shared between a first RFID tag of a plurality of RFID tags and a second RFID tag of the plurality of RFID tags. The RFID tag also comprises circuitry configured to sense a voltage at the node at a time subsequent to the placing of the charge. The RFID tag also comprises circuitry configured to automatically determine whether a connection exists between the first RFID tag and the second RFID tag based on the sensing of the voltage at the node subsequent to the placing of the charge.

In another embodiment, a system for automatically detecting a connection between a plurality of radio-frequency identification (RFID) tags is disclosed. The system comprises a first RFID tag and a second RFID tag. The first RFID tag and/or the second RFID tag comprises circuitry configured to periodically place a charge on a node shared between a first RFID tag of a plurality of RFID tags and a second RFID tag of the plurality of RFID tags. The circuitry also is configured to sense a voltage at the node at a time subsequent to the placing of the charge. Further, the circuitry is further configured to automatically determine whether a connection exists between the first RFID tag and the second RFID tag based on the sensing of the voltage at the node subsequent to the placing of the charge.

In another embodiment, a circuit on a first radio-frequency identification (RFID) tag for automatically detecting a connection status between the first RFID tag and a second RFID tag is disclosed. The RFID tag comprises circuitry configured to periodically place a charge on a node shared between the first RFID tag and the second RFID tag. The RFID tag also comprises circuitry configured to sense a voltage at the node at a time subsequent to the placing of the charge. The RFID tag also comprises circuitry to determine a connection status between the first RFID tag and the second RFID tag based on the sensing of the voltage at the node, wherein the connection status between the first RFID tag and the second RFID tag comprises not connected, connected and not powered, and connected and powered. In this manner, the circuitry on the first RFID tag is configured to determine that the first RFID tag and the second RFID are not connected, and/or that the first RFID tag is connected to the second RFID tag and the second RFID tag is not powered, and/or that the first RFID tag is connected to the second RFID tag and that the second RFID tag is powered.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Figure 1:
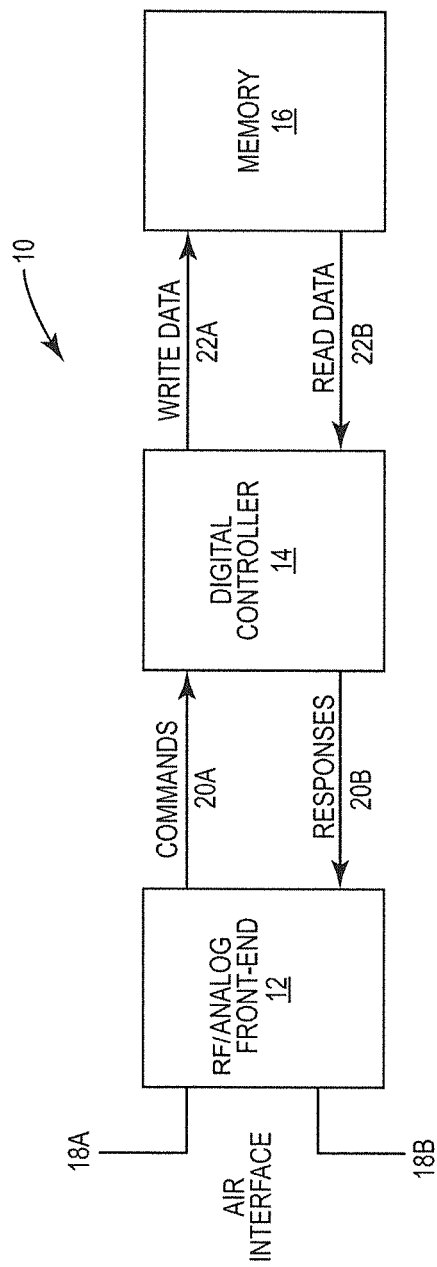
FIG. 1 is a block diagram of an exemplary radio-frequency identification (RFID) tag.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include methods, circuits, and systems for radio-frequency identification (RFID) tag-to-tag autoconnect discovery. For purposes of this application, "autoconnect discovery" refers to the ability of a device such as an RFID tag, or a circuit, to sense a electrical connection to another device or circuit, and/or to sense a disconnection from another device or circuit, without assistance from any means external to the device or circuit. The embodiments include methods, circuits, and systems for sensing connection and disconnection events between electronic circuits, particularly those in RFID, which are also referred to as RFID tags or transponders. In one embodiment, a disclosed method includes periodically placing a charge on a node shared between a first RFID tag and a second RFID tag. The method also includes sensing a voltage at the node at a time subsequent to the placing of the charge. The method also comprises automatically determining whether a connection exists between the first RFID tag and the second RFID tag based on the sensing of the voltage at the node. In this manner, RFID tags can automatically detect connection to another RFID tag to exchange information between the RFID tags, as a non-limiting example. Exchanging information between RFID tags can be used for non-limiting applications such as knowing when cabling has been reconfigured, providing time stamps audit trailing, and providing alarms for erroneous events.

The embodiments described herein also permit automatic discovery of physical interconnects being made and broken between related components in a network of fiber-optic cables and optical communications equipment. This promotes automation of data center network management. In another embodiment, a circuit on a radio-frequency identification (RFID) tag for automatically detecting a connection between the RFID tag and another RFID tag is disclosed. In another embodiment, a system for automatically detecting a connection between a plurality of radio-frequency identification (RFID) tags is disclosed. In another embodiment, a communications interface is disclosed that comprises an electronic circuit and operating protocol that allows for self-detection of an event in which a like circuit is connected or disconnected. In another embodiment, a low-power electrical interface is provided on a chip that senses connections to other, identical interfaces. In another embodiment, a circuit on a first radio-frequency identification (RFID) tag is provided that detects a connection status between the first RFID tag and a second RFID tag, in which the circuitry on the first RFID tag is configured to determine that the first RFID tag and the second RFID are not connected, and/or that the first RFID tag is connected to the second RFID tag and the second RFID tag is not powered, and/or that the first RFID tag is connected to the second RFID tag and that the second RFID tag is powered.

In this regard, FIG. 1 provides a block diagram of an exemplary RFID tag 10. In the most fundamental sense, the exemplary RFID tag 10 consists of three major circuit blocks: an RF analog front-end 12, a digital controller 14, and a memory 16. In one embodiment, the memory 16 is a non-volatile memory. An external RFID reader (not shown) supplies energy 18A and a communications signal 18B over an exemplary air interface, as indicated in FIG. 1. By demodulating the communications signal 18B at the RF analog front-end 12, commands 20A are indicated to the digital controller 14. Acting on the commands 20A, the digital controller 14 accesses the RFID tag 10's unique stored information, such as an identification code, in the memory 16. The contents of the memory 16 can thus be read or written.

When reading, data from the memory 16 is typically formatted for transmission back to the RFID reader through the RF analog front-end 12. However, when RFID tags, such as the RFID tag 10, are installed on related items and the configuration of the ensemble is of interest, it is desirable that the RFID tags exchange certain information between themselves, indicating physical connectivity, as diagrammed in FIG. 2.

Figure 2:
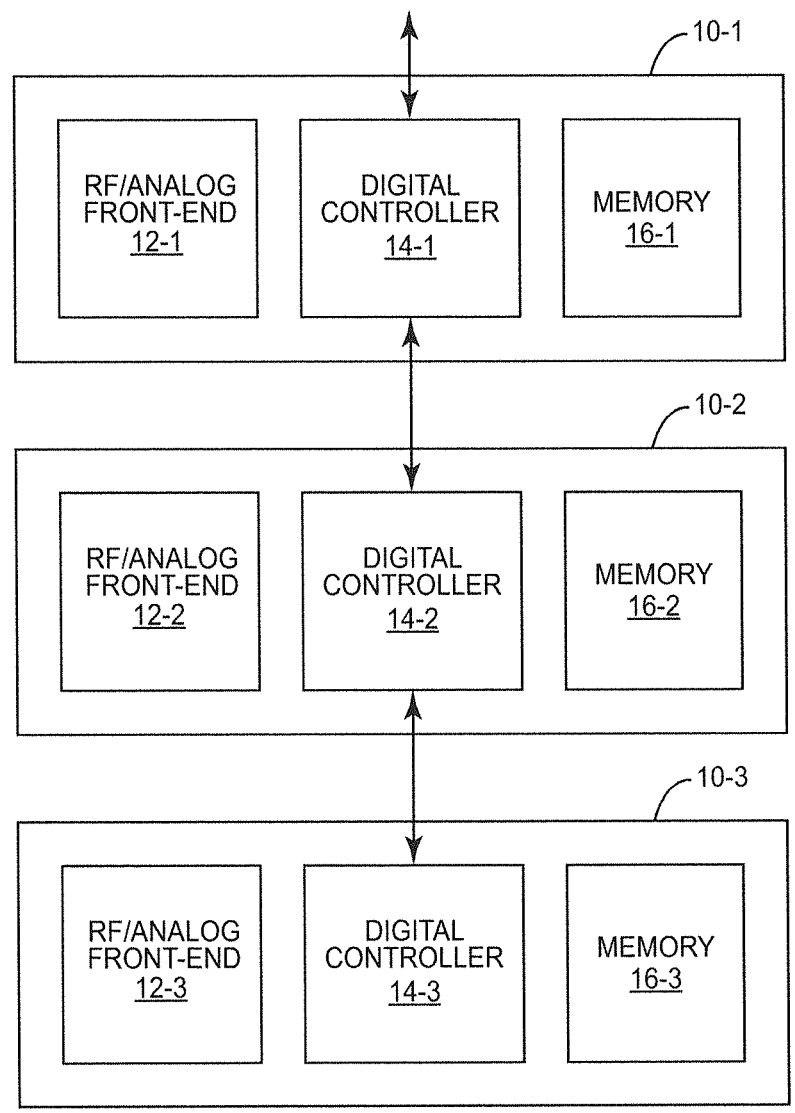
FIG. 2 is a schematic diagram of exemplary RFID tags connected to each other and capable of exchanging information between themselves according to one embodiment.

FIG. 2 is a schematic diagram of exemplary RFID tags connected to each other and capable of exchanging information between themselves according to one embodiment. In the embodiment shown in FIG. 2, the RFID tag 10(1) has an RF analog front-end 12(1), a digital controller 14(1) and a memory 16(1). Likewise, the RFID tag 10(2) has an RF analog front-end 12(2), a digital controller 14(2), and a memory 16(2), and the RFID tag 10(3) has an RF analog front-end 12(3), a digital controller 14(3), and a memory 16(3). In one embodiment, the memories 16(1), 16(2), and 16(3) are non-volatile memories. In this embodiment, there are three RFID tags 10(1), 10(2), and 10(3) connected to each other and capable of exchanging information between themselves. In other embodiments, any number of RFID tags may be connected to each other. In addition, although FIG. 2 shows the RFID tags 10(1), 10(2), and 10(3) in a point-to-point configuration, the RFID tags may be connected in various other configurations, including but not limited to, chain configurations, ring configurations, and bus configurations.

As mentioned above, when RFID tags, such as the RFID tag 10, are installed on related items and the configuration of the ensemble is of interest, it is desirable that the RFID tags exchange certain information between themselves, indicating physical connectivity, as shown in FIG. 2. One such example occurs when mating a fiber-optic cable to a patch panel, where it may be desirable to determine the association between a cable end and a port, as shown in FIG. 3.

Figure 3:
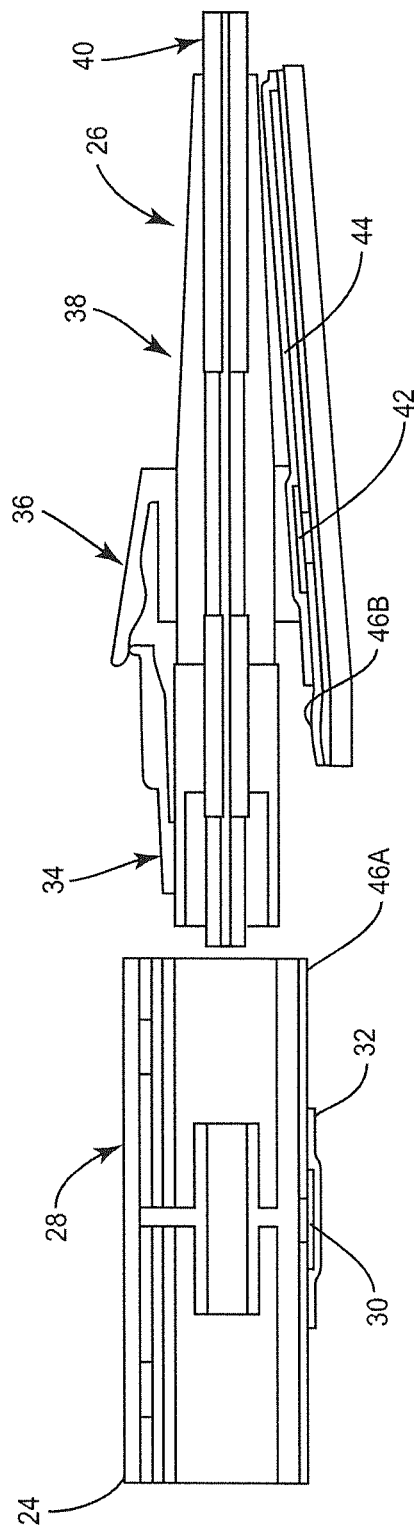
FIG. 3 is a schematic diagram of an exemplary fiber optic cable being mated at one end to an exemplary port of a patch panel.

FIG. 3 is a schematic diagram of an exemplary fiber optic cable being mated at one end to an exemplary port of a patch panel. A port 24, such as in a patch panel (not shown), is configured to mate to a fiber optic cable 26. In particular, the port 24 has a adapter port 28 configured to receive one end of the fiber optic cable 26. In one embodiment, the fiber optic cable may have a fiber optic connector at the one end. In one embodiment, as shown in FIG. 3, the port 24 may include an RFID chip 30 and an associated antenna 32 for communication of RF signals. The fiber optic cable 26 may have a connector 34 for connecting one end of the fiber optic cable 26 to the port 24 via the adapter port 28. The fiber optic cable 26 may also have a trigger 36 for selectively pressing the connector 34 downward to allow the end of the fiber optic cable 26 to be placed into the port 24. The fiber optic cable 26 may also have a boot 38 and a jacket 40 for protecting any optical fibers inside the fiber optic cable 26. In one embodiment, the fiber optic cable 26 includes an RFID chip 42 and an associated antenna 44 for communicating RF signals. The RFID chip 42 and the associated antenna 44 in the fiber optic cable 26 may be used to communicate with the RFID chip 30 and the associated antenna 32 when mating the fiber-optic cable 26 to the port 24 in a patch panel to determine an association between the fiber optic cable 26 and the port 24. In one embodiment, the port 24 and the fiber optic cable 26 may have respective interchip contact electrodes 46A and 46B, such that when the end of the fiber optic cable 26 is placed into the port 24, the RFID chips 30 and 42 have a physical connection through the interchip contact electrodes 46A and 46B. In this regard, when the fiber optic cable 26 is inserted into the port 24, the interchip contact electrodes 46A and 46B may be referred to as a node shared between the port 24 of the patch panel and the fiber optic cable 26. In another embodiment, the RFID tags 30 and 42 may be specifically associated with the adapter port 28 and the connector 34 (also known as a fiber optic connector), respectively.

Inasmuch as fiber-optic cabling is constructed solely from dielectric materials, the availability of an electrical polling mechanism in the form of RFID tags, as shown in FIG. 3, offers previously unavailable capabilities for network configuration discovery. Tagged items are no longer separate and independent, but may be associated such that connection networks can be inferred.

However, prior to exchanging information between connected RFID tags, including (but not limited to) their individual ID numbers, it is desirable that a determination be made by the affected RFID tags that a connection event has occurred. For many uses of RFID tags, including, but not limited to optical cable components in data centers, configurations may be dynamically changing in the field, making and breaking connection paths arbitrarily, both spatially and temporally. It is desirable that RFID tags sense the connection being made (and broken) in real-time. Complicating this requirement is the fact that RFID tags operate on very low power, and may be unpowered for significant periods, thereby needing to re-establish that connectivity exists with minimum energy. In particular, it is difficult to detect when RFID tags are connected, especially when two RFID tags are connected and one of the two RFID tags is unpowered. The protocol described herein addresses this difficulty and provides the ability to detect the connection status of two RFID tags under at least three conditions: a) disconnected; b) connected and both RFID tags are powered; and c) connected and only one RFID tag is powered.

Figure 4:
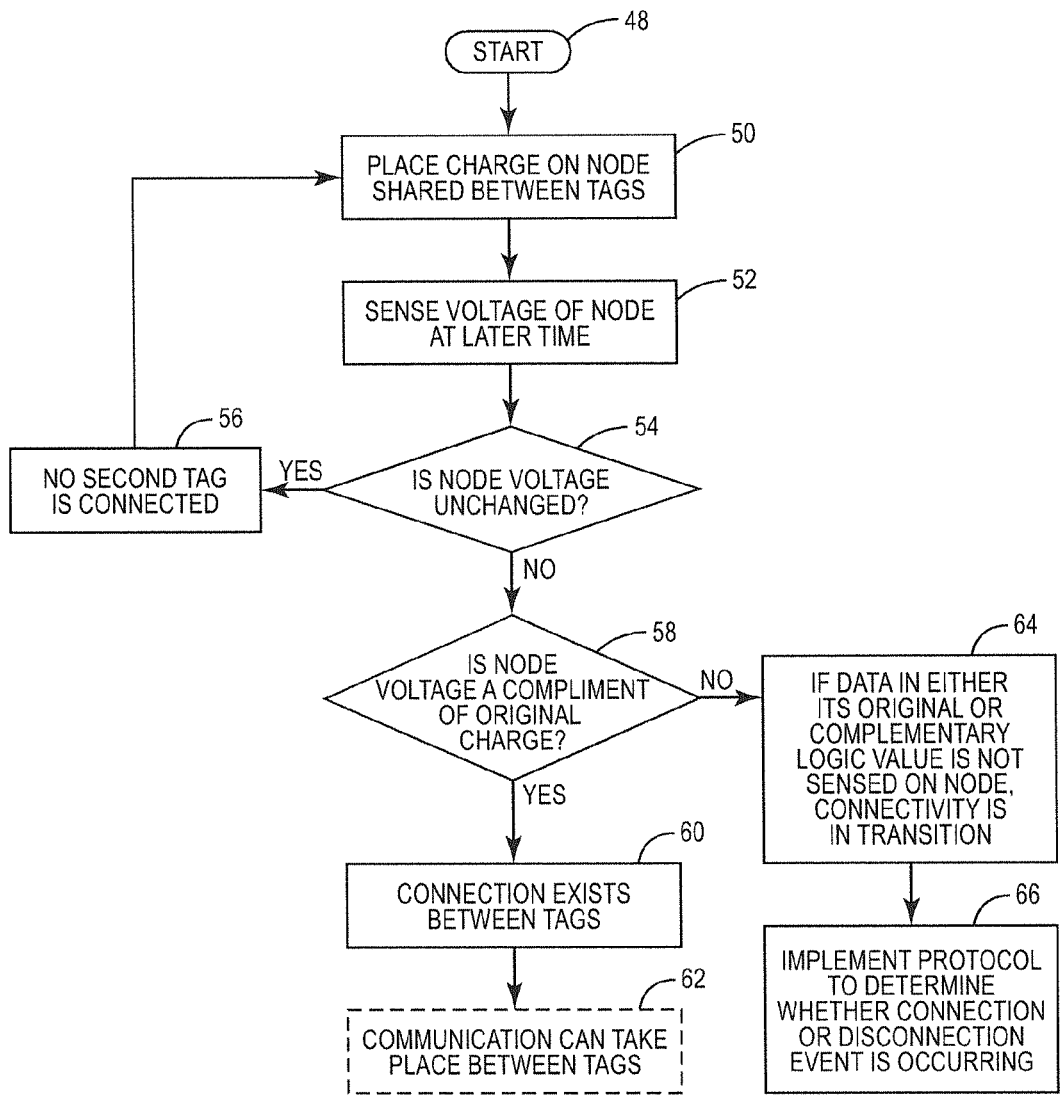
FIG. 4 is a exemplary flow chart illustrating an exemplary protocol for detecting a connection or disconnection event between two exemplary RFID tags.

FIG. 4 is an exemplary flow chart illustrating an exemplary protocol for detecting a connection or disconnection event between two exemplary RFID tags. Only one of the RFID tags needs to be powered; however, in another embodiment, the other RFID tag may also be powered. The exemplary protocol starts at block 48. At block 50, a charge is placed on a node shared between two or more RFID tags by a first one of the RFID tags. In one embodiment, the node may be an electrode such as interchip contact electrodes 46A and 46B in FIG. 3. In one embodiment, the charge placed on the node shared by the two RFID tags may be a voltage. In another embodiment, the charge placed on the node will result in a voltage being present at the node. The voltage at the node is then sensed (block 52) at some later time, i.e. a time subsequent to the placing of the charge in block 50. In one embodiment, the sensing block 52 may occur at periodic intervals.

Based on the sensed voltage at the node, the first RFID tag detects whether another RFID tag is connected to it by comparing the node voltage sensed at the node with the voltage resulting from the charge placed on the node (block 54). If the voltage sensed at the node is unchanged from the voltage resulting from the charge placed on the node, then no second RFID tag is connected to the first RFID tag that placed the charge on the node (block 56). In one embodiment, the first RFID tag starts the process from the beginning by placing a new charge on the node. In another embodiment, the first RFID tag may wait a period of time and then repeat blocks 52 and 54 to detect whether a connection exists between the RFID tags. If the node voltage has changed, then a determining block 58 is performed to see if the node voltage is a complement (inverted value) of the voltage resulting from the original charge placed on the node. If so, then a connection is known to exist between the RFID tags (block 60). Once a connection is determined to exist between the two RFID tags, the detecting protocol is finished and an optional communication block 62 can take place between the RFID tags. The communication of information between the RFID tags can include any type of communication. For examples of the type of communications between connected RFID tags that are possible, reference is made to co-pending U.S. application Ser. No. 13/363,808; Ser. No. 13/363,851; and Ser. No. 13/363,890, which are incorporated by reference herein in their entireties.

If a given sequence of data in either its original or complementary (inverted) logic value is not sensed on the node, then it is determined that connectivity between the two RFID tags is in transition (block 64). Then a separate protocol is implemented to determine whether a connection or a disconnection is occurring (block 66).

Figure 5:
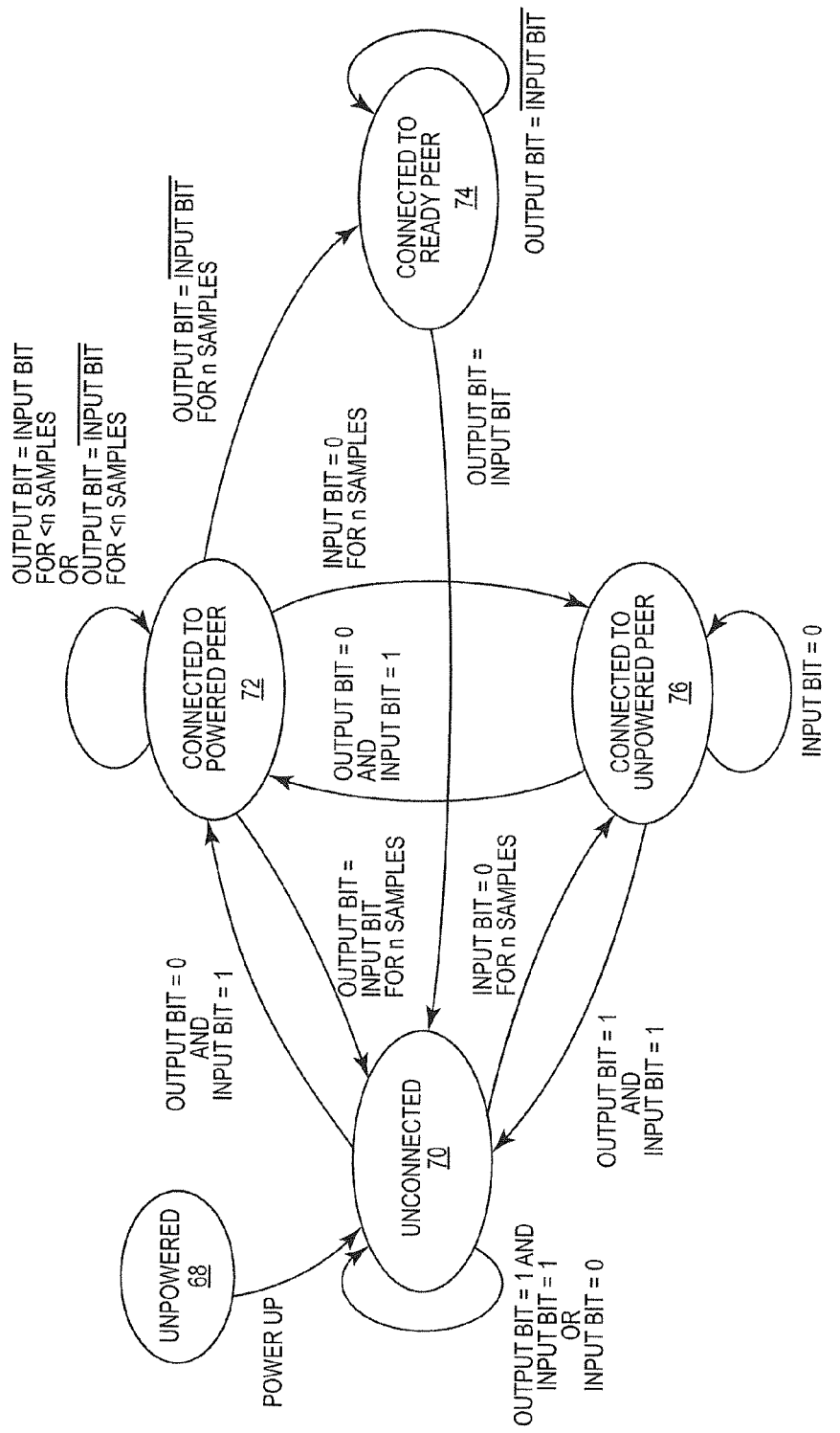
FIG. 5 is an exemplary state diagram illustrating an exemplary detection sequence between two exemplary RFID tags.

FIG. 5 is an exemplary state diagram illustrating an exemplary discovery sequence between two exemplary RFID tags. The state diagram in FIG. 5 illustrates the connect/disconnect discovery sequence between the two exemplary RFID tags. The state diagram is relative to a single interface, so that when two interfaces are being connected or disconnected, each will follow its own state sequence. Often, both will make the same transitions at or about the same time. To help explain the operation, the discovery sequence will be described from the viewpoint of a single RFID tag.

Initially, a circuit in a first RFID tag is unpowered, as shown in unpowered state 68. Once power is supplied, the first RFID tag enters the unconnected state 70. Periodically, a charge is placed on a node shared between the first RFID tag and a second RFID tag. In one embodiment, this may be accomplished by placing a data bit from an arbitrary, possibly random, n-bit long sequence supplied by external digital logic on a high-impedance electrode having no static discharge path. Some time later, the voltage on the electrode is read. The first RFID tag stays in the unconnected state 70 for as long as the original sequence value is read back. At some point in time, the first RFID tag may read a different value than the one it places on the electrode, indicating that a physical connection to the second RFID tag is being made; however, the first RFID tag is not yet able to determine whether the connection is to a powered or unpowered peer. If the second RFID tag is powered, as the first RFID tag and the second RFID tags are mated, their sequence values will interfere, whether by the sequences being different or the rate at which the sequences are clocked being independent (noncoherent sources). This causes the first RFID tag to transition to the connected to powered peer state 72 (as will the second RFID tag). Both RFID tags stay in the connected to powered peer state 72 until one of the RFID tags randomly decides to test for an "echo" by repeating back the complement of what it reads. Assuming that the second RFID tag does repeat back the complement of what it reads, the first RFID tag senses the change and moves to the connected to ready peer state 74, from which it sends a confirming message to the second RFID tag. The RFID tags can now communicate. In one embodiment, the two RFID tags may now exchange data, including, but not limited to, identification information.

Both RFID tags then remain quiet until one needs to transmit, and the second RFID tag echoes back the complementary data. To ensure a disconnection is sensed, a periodic message (consisting of as little as a single bit) is exchanged between the first RFID tag and the second RFID tag at regular intervals. If either this signal or a standard message is not acknowledged with complementary data, both RFID tags are forced back into the unconnected state 70.

Still referring to FIG. 5, if the second RFID tag is unpowered when the connection between the first RFID tag and the second RFID tag is first detected, the unpowered second RFID tag defaults to a condition in which it depletes energy from the common electrode upon connection. This has the same effect as previously on the first RFID tag, in that it will read back a different logical value than it places on the electrode. In one embodiment, the value read back by the first RFID tag will consist of all zeros. The first RFID tag thereby recognizes limited connectivity and moves to the connected to unpowered peer state 76. The unpowered second RFID tag cannot actually transition out of its state until power is restored to the second RFID tag, when both RFID tags are able to move to the connected to powered peer state 72. In the event that either of the RFID tags lose and regain power, the RFID tags will also transition between these two states 72 and 76, able to move to the connected to ready peer state 74 only when both have power. However, they will not fall back to the unconnected state 70, and will retain all previously exchanged connectivity information through any transitions. In one embodiment, the previously exchanged information will be retained as long as the two RFID tags remain connected and until the RFID tag that lost power regains power.

Figure 6:
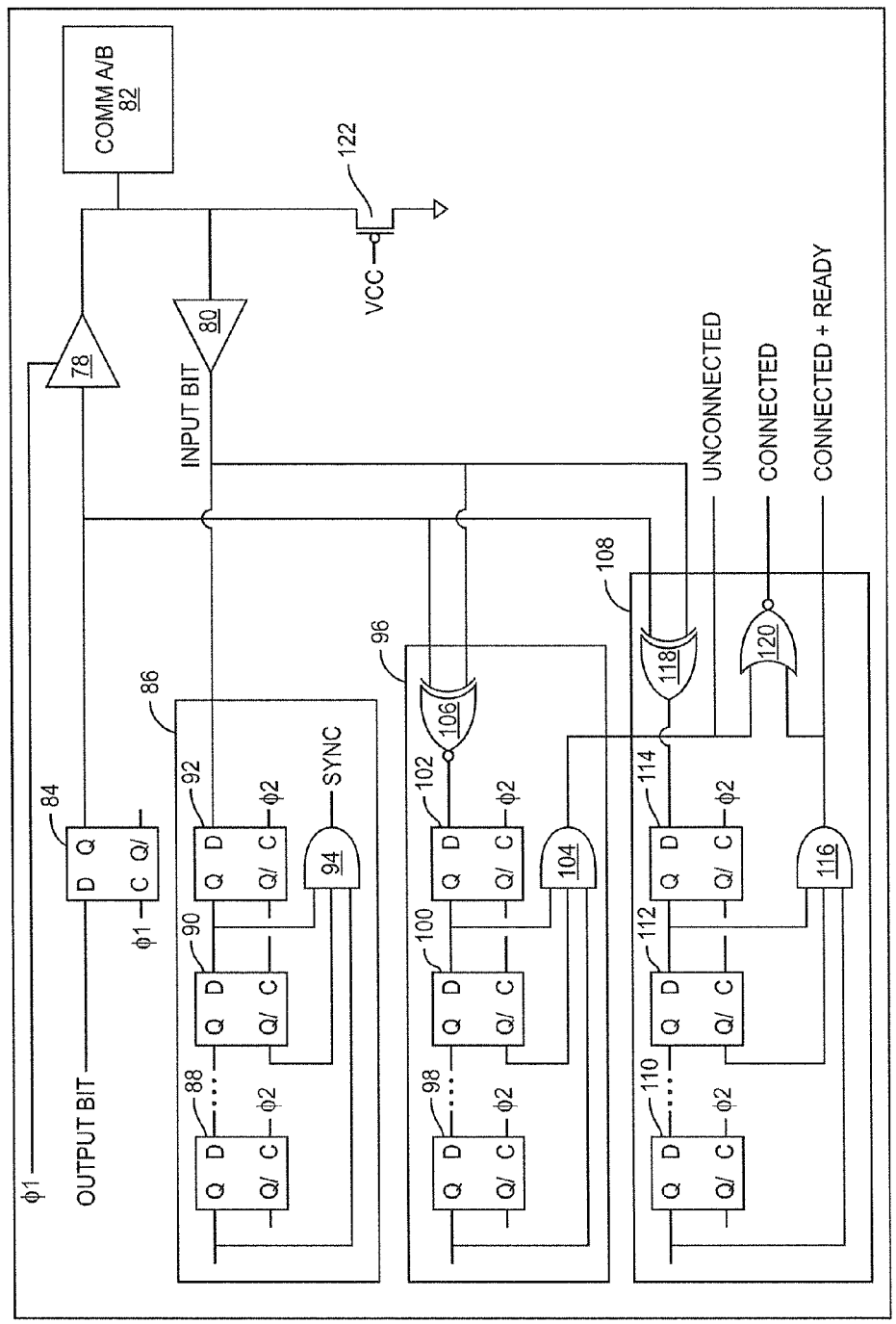
FIG. 6 is a schematic diagram of an exemplary circuit for implementing the exemplary protocol of FIG. 4.

FIG. 6 is a schematic diagram of an exemplary circuit for implementing the exemplary protocol of FIG. 4. In one embodiment, a circuit similar to that shown in FIG. 6 may be placed in one or more RFID tags 10 or devices associated with the one or more RFID tags 10. The exemplary circuit shown in FIG. 6 comprises a transmit buffer 78 that can be put into a high output impedance condition. The exemplary circuit shown in FIG. 6 also includes a receive buffer 80 for input signals. An input-output communication port 82 may be shared between another circuit like the circuit shown in FIG. 6 in another RFID tag. The shared communication port 82 may be a shared node between two RFID tags. The exemplary circuit shown in FIG. 6 also comprises a transmit register 84 and a receive shift register 86 comprising logic circuitry 88, 90, 92, and 94. Also included is a shift register 96 comprising logic circuitry 98, 100, 102, 104, and 106 that indicates if transmit and receive data sequences are the same for a finite number of consecutive bits and a shift register 108 with logic circuitry 110, 112, 114, 116, 118, and 120 that indicates if transmit and receive data sequences are complementary (inverted logic sense) for a finite number of consecutive bits. The exemplary circuit in FIG. 6 also comprises an active load 122, which in one embodiment, may take the form of a pMOS FET. For the discussion that follows, the receive shift register 86, which is not part of the discovery protocol, is not discussed. The role of the receive shift register 86 is in exchanging data between the RFID tags once they have entered the connected to ready peer state 74, as shown above in FIG. 5.

Figure 7:
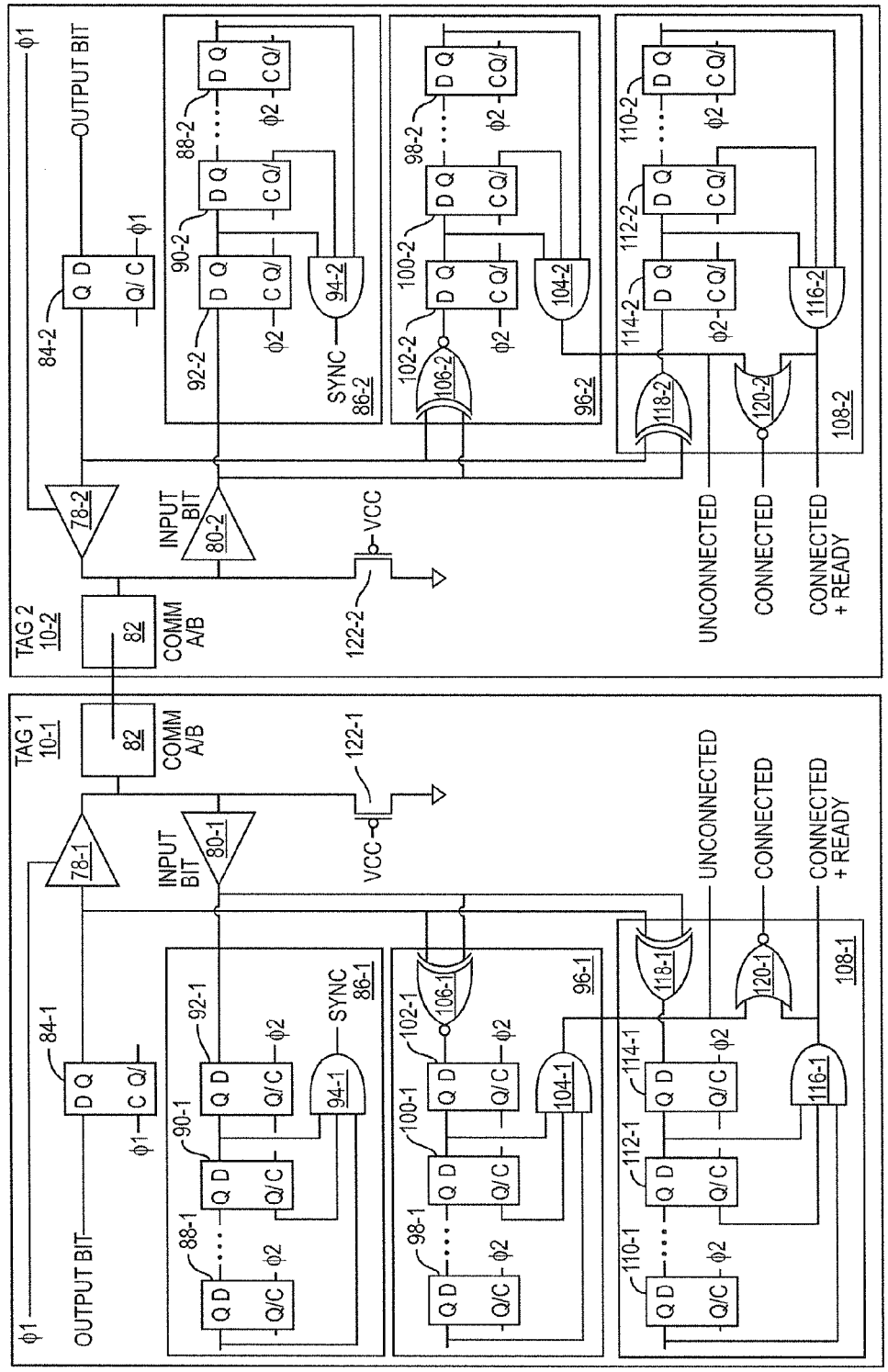
FIG. 7 is a schematic diagram illustrating two exemplary circuits being connected across an exemplary shared port.

Two RFID tags, each having a circuit like the exemplary circuit shown in FIG. 6, may then detect whether they are connected to each other. FIG. 7 is a schematic diagram illustrating two exemplary circuits being connected across an exemplary shared port. The two RFID tags 10(1) and 10(2) each have a circuit like the exemplary circuit shown in FIG. 6. Assume the two RFID tags 10(1) and 10(2) are connected across the shared communication port 82, as in FIG. 7, and the RFID tags 10(1) and 10(2) are initially powered and unconnected, designated by the unconnected state 70 in FIG. 5. In FIG. 7, the shared communication port 82 is a shared node between the RFID tags 10(2) and 10(2). In one embodiment, the shared communication port 82 may include electrodes similar to interchip contact electrodes 46A and 46B in FIG. 3. In one embodiment, each RFID tag 10(1) and 10(2) places a data sequence on the shared communication port 82 by periodically enabling the line driver at a low duty cycle. In this manner, charge is placed on the shared communication port 82's capacitance thereby realizing a high or low voltage level according to whether the data is a logic "1" or "0", respectively. In one embodiment, the capacitance can be in the form of a stray parasitic, or it may be explicitly provided in another embodiment. The low duty cycle comes from a clock signal, Φ1, that is most often low and which causes the transmit buffer (78(1) or 78(2)) to remain in its high impedance condition most of the time, expending no energy. Now, the receive buffer (80(1) or 80(2)) causes this voltage to be sensed and copies the received value onto the shift registers (86(1) or 86(2), 96(1) or 96(2), and 108(1) or 108(2)), clocked by a shifted version of the clock, Φ2. The value is sensed immediately before a potential change in logic level, and in this unconnected condition, is simply the same data stream as supplied to the transmit buffer (78(1) or 78(2)).

Figure 8:
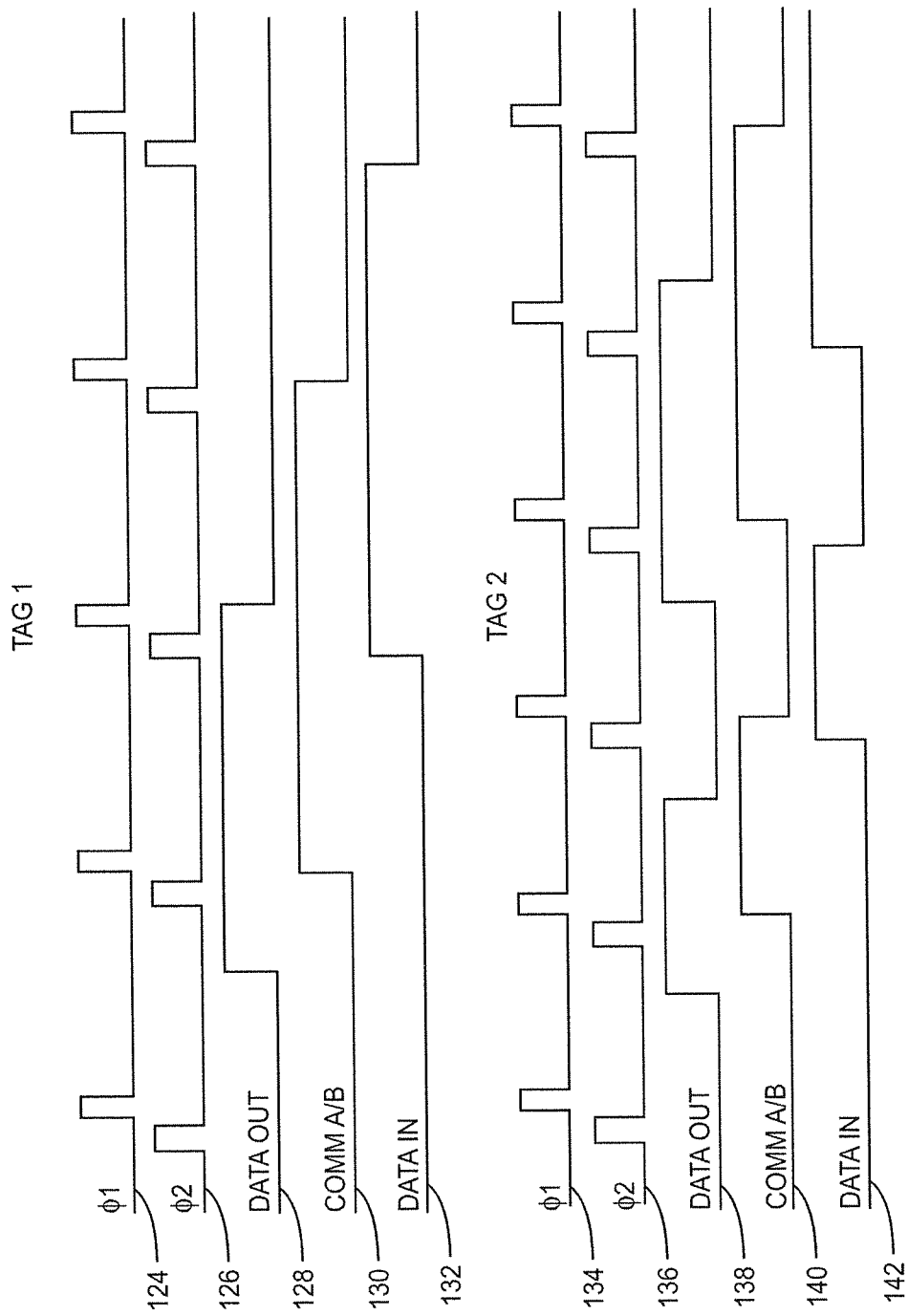
FIG. 8 is an exemplary timing diagram for two exemplary unconnected RFID tags.

Waveforms for two unconnected RFID tags are shown in FIG. 8. FIG. 8 is an exemplary timing diagram for two exemplary unconnected RFID tags, where the clocks are uncorrelated in phase and not necessarily even at the same frequency as one another (i.e., Φ1 and Φ2 in the first RFID tag 10(1) (see waveforms 124 and 126) are not connected to Φ1 and Φ2 in the second RFID tag 10(2) (see waveforms 134 and 136), and will be different according to RFID tag manufacturing tolerances). Each RFID tag 10(1) and 10(2) generates a data sequence by periodically enabling the line driver at a low duty cycle (as shown by waveforms 128 and 138, respectively). The data sequence is then placed on the shared communication port 82 (as shown by waveforms 130 and 140 respectively). Each of the RFID tags 10(1) and 10(2) then periodically senses the voltage at the shared communication port 82 at a later time (i.e. a time subsequent to the placing of the data sequence on the shared communication port 82) (as shown by waveforms 132 and 142 respectively). Therefore, when the received sequence (waveform 132 in the first RFID tag and 142 in the second RFID tag) equals the transmitted sequence (waveform 128 in the first RFID tag and waveform 138 in the second RFID tag) shifted in time, the circuit shown in FIG. 7 in each of the RFID tags 10(1) and 10(2) asserts that no connection with any like circuit exists. Meanwhile, the bits of the receive shift register (86(1) or 86(2)) can be logically combined (see logic 94(1) and 94(2) in FIG. 7) to recognize a given pattern, which when present indicates a synchronization signal.

Figure 9:
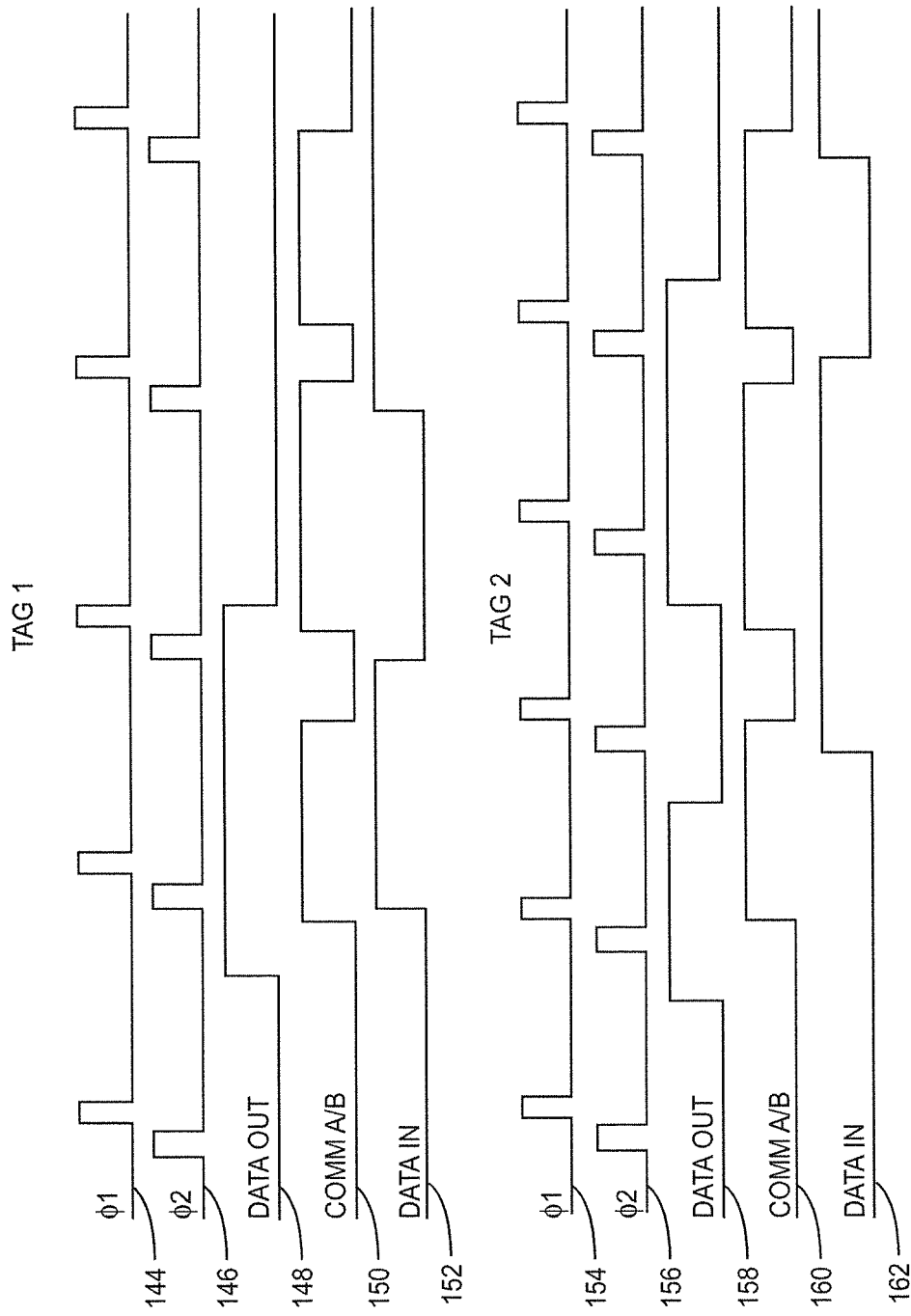
FIG. 9 is an exemplary timing diagram for two exemplary connected RFID tags, where one exemplary RFID tag senses a powered and connected RFID tag.

Next, assume that a connection is made between the two RFID tags 10(1) and 10(2) in FIG. 7. Here, the circuits of each RFID tag 10(1) and 10(2) will contend for control of the shared node, with waveforms as shown in FIG. 9. FIG. 9 is an exemplary timing diagram for two exemplary connected RFID tags, where one exemplary RFID tag senses a powered and connected RFID tag. Note that the clocks may still be uncorrelated in phase and not necessarily even at the same frequency as one another (i.e., Φ1 and Φ2 in the first RFID tag 10(1) (see waveforms 144 and 146) are not connected to Φ1 and Φ2 in the second RFID tag 10(2) (see waveforms 154 and 156), and will be different according to RFID tag manufacturing tolerances). As before, each of the RFID tags 10(1) and 10(2) generates a data sequence by periodically enabling the line driver at a low duty cycle (as shown by waveforms 148 and 158, respectively). The data sequence is then placed on the shared communication port 82 (as shown by waveforms 150 and 160 respectively). Each of the RFID tags 10(1) and 10(2) then periodically senses the voltage at the shared communication port 82 at a time subsequent to the placing of the data sequence on the shared communication port 82 (as shown by waveforms 152 and 162 respectively). However, if the two RFID tags 10(1) and 10(2) are connected, then each of the RFID tags 10(1) and 10(2) will tend to overwrite the sequence of the other, making it impossible to read back the transmitted signal of each. The circuit in each of the RFID tags 10(1) and 10(2) thereby senses that the shared communication port 82 is no longer unconnected, and that a change in the connected status has just occurred.

This places the RFID tags 10(1) and 10(2) in an intermediate discovery condition, however, designated by the connected to powered peer state 72 of the diagram in FIG. 5. From this condition, one RFID tag can randomly choose to stop transmitting its sequence, and instead reads the data placed on the shared communication port 82 and inverts it. The other RFID tag now senses the inverted data stream, and knows that it is connected to a like RFID tag and that data may be exchanged, so it is in the connected to ready peer state 74 of the diagram of FIG. 5.

Figure 10:
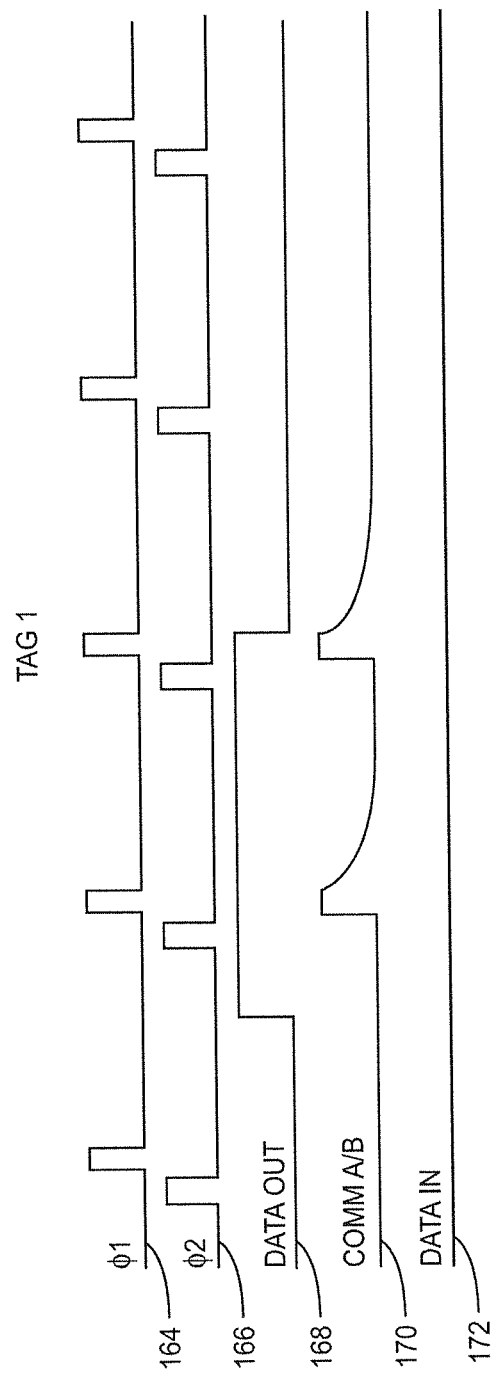
FIG. 10 is an exemplary timing diagram for two exemplary connected RFID tags, where one exemplary RFID tag senses a connected but unpowered RFID tag.

A special case arises when two RFID tags are connected, but one of the two connected RFID tags is unpowered (the connected to unpowered peer state 76 described above in FIG. 5). FIG. 10 is an exemplary timing diagram for two exemplary connected RFID tags, where one exemplary RFID tag senses a connected but unpowered RFID tag. The powered RFID tag acts as previously (see waveforms 164 and 166 for the clock signals and waveform 166 for the data sequence generated by the first RFID tag), but the unpowered RFID tag is purely passive. For this condition, the active load presented to the powered RFID tag by the unpowered RFID tag is a transistor biased in the linear region, which behaves as a resistor, discharging the shared node as indicated in the waveforms 170 and 172 of FIG. 10. This causes the first RFID tag's energy to be dissipated (see waveform 170) such that it cannot sense its sequence (it senses a steady stream of zeros), as evidenced by waveform 172. Based on this, the first RFID tag knows something is connected to it.

However, in the unpowered condition, the second RFID tag cannot exchange information, so all the first RFID tag can know is that it is connected to a like circuit, which is indicated by the connected to unpowered peer state 76 in the diagram of FIG. 5. The first RFID tag stays in the intermediate discovery condition indefinitely—that is, until power is supplied to the second RFID tag, enabling the second RFID tag to transition first from the unpowered state 68 to the unconnected state 70 as it begins to transmit its unique sequence, and finally to the connected to powered peer state 72 as one RFID tag acknowledges the sequence of the other RFID tag. Once power is restored to the previously unpowered RFID tag, the load transistor is biased in an off condition, and no current is shunted to ground. Now, the first RFID tag sees the condition represented by FIG. 9, and will transition from the connected to unpowered peer state 76 to the connected to powered peer state 72 as in the previous case, by virtue of the second RFID tag's sequence no longer being a steady stream of zeros. Both RFID tags will ultimately transition to the connected to ready peer state 74 as described above. It is possible for the second RFID tag to gain and lose power before the first RFID tag transitions to the connected to ready peer state 74; if so, the first RFID tag will toggle between the connected to powered peer state 72 and the connected to unpowered peer state 76 until the second RFID tag's power is stable long enough for the first RFID tag to finally transition to its connected to ready peer state 74.

With both RFID tags in the connected to ready peer state 74, data can be exchanged. Either RFID tag can transmit at any time. So long as the transmitted data is acknowledged by the receiving RFID tag by having the latter echo the inverted data, both RFID tags stay in the connected to ready peer state 74. On the other hand, if data is not acknowledged correctly, the RFID tags may have either become disconnected, or the receiving RFID tag may have lost power. The transmitting RFID tag is forced back to the unconnected state 70 immediately as it sees a different data stream than what it expects.

If the receiving RFID tag has power, it will not necessarily know about the disconnect, as it is simply in a listening mode. To address this, in one embodiment, both RFID tags may periodically transmit a sample bit, at a very low duty cycle, as a "heartbeat" signal. It is then possible to detect a disconnect or a loss of power between the RFID tags based on whether the heartbeat signal was received. It is further possible to detect which one of the disconnect or the loss of power was detected based on the voltage sensed at the node subsequent to the placing of the charge. In this manner, both RFID tags will eventually sense that the disconnection event has occurred, and both will transition to the unconnected state 70. Implied is a delay that is long relative to the electrical interface, (milliseconds, perhaps) but short with respect to the time scale of a physical disconnection event initiated by a human operator.

If the receiving RFID tag has lost power, it defaults back to the unpowered state 68. Once power is restored, the connection protocol can re-initiate as described above.

The embodiments described herein provide a low-power, one-wire electrical interface on an RFID tag that senses connections to other similar RFID tags. Only one of the two connected RFID tags needs to be powered. A sensing action is performed by periodically placing charge on a node shared between two chips and reading the voltage on the node some time later. If the node voltage is unchanged, no second RFID tag is connected. If the node voltage is the complement of what is driven, a connection between the RFID tags is known to exist. If neither the original or a complemented sequence data exists on the shared node, the interface of the RFID tag knows it is in a connectivity transition and implements a simple protocol to determine whether a connection or disconnection event is occurring.

By using the protocol, methods, and systems described herein, RFID tags on adjacent assemblies can sense whether are connected, and if so, exchange of data between the two RFID tags is enabled. This enables discovery of entire network topologies and allows automating configuration determination. By employing the disclosed protocols and related systems and methods, RFID tag-to-tag connectivity can be determined without the need to burden the RFID reader with extensive communication between two or more RFID tags. Once the connectivity of two or more mated RFID tags is established, the two or more mated RFID tags can communicate with each other using direct connections between the RFID tags. In this manner, the two or more mated RFID tags may send a signal, data, or other information between connected RFID tags.

In one embodiment, a circuit on a first radio-frequency identification (RFID) tag is provided that detects a connection status between the first RFID tag and a second RFID tag, in which the circuitry on the first RFID tag is configured to determine that the first RFID tag and the second RFID are not connected, and/or that the first RFID tag is connected to the second RFID tag and the second RFID tag is not powered, and/or that the first RFID tag is connected to the second RFID tag and that the second RFID tag is powered.

Any functionalities disclosed in any embodiments may be incorporated or provided in any other embodiments with suitable circuitry and/or devices. Although the illustrated embodiments are directed to components, wherein RFID-enabled versions of the components, including ICs and IC chips, employ passive RFID tags, further embodiments include one or more semi-passive or active RFID tags depending upon the particular functionality of the RFID tag system desired.

Although the embodiments described herein are directed to RFID tags for communications, the embodiments are applicable to any type of component. Examples include other integrated circuit chips, fiber optic connectors and adapters, or copper connectors and adapters and other fiber optic and/or copper components. Embodiments disclosed herein can be used in non-telecommunications equipment, particularly regarding components that interconnect and/or are exposed to various conditions for which it is desirable to know the location, connectivity, and/or conditions of the components. The technology described herein is applicable to any two items that need to be mated with each other in a known way, such as electrical connectors, medical devices, fluid couplings, beverage dispensing containers, industrial controls, environmental monitoring devices, connection of consumer electronics, electronics assemblies and subassemblies, containers and lids, doors and doorframes, windows and sills, and many other applications. The terms "plug" and "socket" are generally used herein to define portions of components that are adapted for connecting to one another, such as a connector that is received by an adapter, and are not necessarily limited to standard plugs and sockets.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings.

Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

I claim:

1. A method of automatically detecting a connection between a plurality of radio-frequency identification (MD) tags, comprising:
    periodically placing a charge by a first RFID tag on a node shared between the first RFD tag of the plurality of RFID tags and a second RFID tag of the plurality of RFID tags;
    sensing a voltage at the node by the first RFID tag at a time subsequent to the placing of the charge; and
    automatically determining by the first RFD tag whether a connection exists between the first RFID tag and the second RFID tag based on the sensing of the voltage at the node.

2. The method of claim 1 further comprising comparing the voltage sensed at the node subsequent to the placing of the charge with a voltage resulting from the charge placed on the node.

3. The method of claim 2 further comprising determining that no connection exists between the first RFID tag and the second RFID tag if the voltage sensed at the node subsequent to the placing of the charge is unchanged from the voltage resulting from the charge placed on the node.

4. The method of claim 2 further comprising determining that a connection exists between the first RFID tag and the second RFID tag if the voltage sensed at the node subsequent to the placing of the charge is a complement of the voltage resulting from the charge placed on the node.

5. The method of claim 4 further comprising exchanging information between the first RFID tag and the second RFID tag after determining that a connection exists between the first RFID tag and the second RFID tag.

6. The method of claim 5 further comprising determining that one of the first RFID tag and the second RFID tag loses power based on the voltage sensed at the node subsequent to the placing of the charge.

7. The method of claim 6 further comprising retaining previously exchanged information as long as the first RFID tag and the second RFID tag remain connected and until the one of the first RFID tag and the second RFID tag that lost power regains power.

8. The method of claim 4 further comprising exchanging a periodic heartbeat signal between the first RFID tag and the second RFID tag.

9. The method of claim 8 further comprising detecting a disconnect or a loss of power between the first RFID tag and the second RFID tag based on whether the heartbeat signal is received.

10. The method of claim 9 further comprising determining which one of the disconnect or the loss of power was detected based on the voltage sensed at the node subsequent to the placing of the charge.

11. The method of claim 2 further comprising determining that a connectivity between the first RFID tag and the second RFID tag is in transition if the voltage sensed at the node subsequent to the placing of the charge is neither an original value of the voltage resulting from the charge placed on the node or a complement of the voltage resulting from the charge placed on the node.

12. The method of claim 11 further comprising determining whether a connection or a disconnection event is occurring.

13. The method of claim 1, wherein one of the first RFID tag and the second RFID tag is unpowered.

14. The method of claim 1 further comprising determining that one of the first RFID tag and the second RFID tag is unpowered based on the voltage sensed at the node subsequent to the placing of the charge.

15. The method of claim 1, wherein the first RFID tag is associated with a fiber optic connector and the second RFID tag is associated with an adapter port in a fiber optic patch panel.

16. The method of claim 1, wherein at least one of the first RFID tag and the second RFID tag is a passive RFID tag.

17. A circuit on a first radio-frequency identification (RFID) tag for automatically detecting a connection between the first RFID tag and a second RFID tag comprising circuitry configured to:
    periodically place a charge on a node shared between the first RFID tag of a plurality of RFID tags and the second RFID tag;
    sense a voltage at the node at a time subsequent to the placing of the charge; and
    automatically determine whether a connection exists between the first RFID tag and the second RFID tag based on the sensing of the voltage at the node.

18. The circuit of claim 17, wherein the circuitry is further configured to compare the voltage sensed at the node subsequent to the placing of the charge with a voltage resulting from the charge placed on the node.

19. The circuit of claim 18, wherein the circuitry is further configured to determine that no connection exists between the first RFID tag and the second RFID tag if the voltage sensed at the node subsequent to the placing of the charge is unchanged from the voltage resulting from the charge placed on the node.

20. The circuit of claim 18, wherein the circuitry is further configured to determine that a connection exists between the first RFID tag and the second RFID tag if the voltage sensed at the node subsequent to the placing of the charge is a complement of the voltage resulting from the charge placed on the node.

21. The circuit of claim 20, wherein the circuitry is further configured to determine that the second RFID tag loses power based on the voltage sensed at the node subsequent to the placing of the charge.

22. The circuit of claim 21, wherein the circuitry is further configured to retain previously exchanged information as long as the first RFID tag and the second RFID tag remain connected and until the second RFID tag regains power.

23. The circuit of claim 20, wherein the circuitry is further configured to exchange information between the first RFID tag and the second RFID tag after it is determined that a connection exists between the first RFID tag and the second RFID tag.

24. The circuit of claim 23, wherein the circuitry is further configured to determine that the second RFID tag loses power based on the voltage sensed at the node subsequent to the placing of the charge.

25. The circuit of claim 20, wherein the circuitry is further configured to exchange a periodic heartbeat signal between the first RFID tag and the second RFID tag.

26. The circuit of claim 25, wherein the circuitry is further configured to detect a disconnect or a loss of power between the first RFID tag and the second RFID tag based on whether the periodic heartbeat signal is received by the first RFID tag.

27. The circuit of claim 26, wherein the circuitry is further configured to determine which one of the disconnect or the loss of power was detected based on the voltage sensed at the node subsequent to the placing of the charge.

28. The circuit of claim 18, wherein the circuitry is further configured to determine that a connectivity between the first RFID tag and the second RFID tag is in transition if the voltage sensed on the node subsequent to the placing of the charge is neither an original value of the voltage resulting from the charge placed on the node or a complement of the voltage resulting from the charge placed on the node.

29. The circuit of claim 28, wherein the circuitry is further configured to determine whether a connection or a disconnection event is occurring.

30. The circuit of claim 17, wherein the circuitry is further configured to determine that the second RFID tag is unpowered based on the voltage sensed at the node subsequent to the placing of the charge.

31. A system for automatically detecting a connection between a plurality of radio-frequency identification (RFID) tags comprising:
 a first RFID tag; and
 a second RFID tag,
 wherein at least one of the first RFID tag and the second RFID tag comprises circuitry configured to:
  periodically place a charge on a node shared between a first RFID tag of a plurality of RFID tags and a second RFID tag of the plurality of RFID tags;
  sense a voltage at the node at a time subsequent to the placing of the charge; and
  automatically determine whether a connection exists between the first RFID tag and the second RFID tag based on the sensing of the voltage at the node.

32. A circuit on a first radio-frequency identification (RFID) tag for automatically detecting a connection status between the first RFID tag and a second RFID tag comprising circuitry configured to:
 periodically place a charge on a node shared between the first RFID tag and the second RFID tag;
 sense a voltage at the node at a time subsequent to the placing of the charge; and
 determine a connection status between the first RFID tag and the second RFID tag based on the sensing of the voltage at the node,
 wherein the connection status between the first RFID tag and the second RFID tag comprises not connected, connected and not powered, and connected and powered.

33. The circuit of claim 32, wherein the circuit is further configured to determine that the first RFID tag and the second RFID are not connected.

34. The circuit of claim 32, wherein the circuit is further configured to:
 determine that the first RFID tag is connected to the second RFID tag; and
 determine that the second RFID tag is not powered.

35. The circuit of claim 32, wherein the circuit is further configured to:
 determine that the first RFID tag is connected to the second RFID tag; and
 determine that the second RFID tag is powered.

* * * * *

UNITED STATES PATENT AND TRADEMARK OFFICE
CERTIFICATE OF CORRECTION

PATENT NO. : 9,165,232 B2  
APPLICATION NO. : 13/470571  
DATED : October 20, 2015  
INVENTOR(S) : Robert M. Glidden, III Page 1 of 1

It is certified that error appears in the above-identified patent and that said Letters Patent is hereby corrected as shown below:

IN THE CLAIMS

Claim 1, at column 13, line 33, change "(MD)" to --(RFID)--.
Claim 1, at column 13, line 36, change "RFD" to --RFID--.
Claim 1, at column 13, line 40, change "RFD" to --RFID--.

Signed and Sealed this
Twenty-ninth Day of March, 2016

Michelle K. Lee
*Director of the United States Patent and Trademark Office*